US012599980B2

(12) United States Patent
   Li et al.

(10) Patent No.: US 12,599,980 B2
(45) Date of Patent: Apr. 14, 2026

(54) INNER BURR REMOVAL TOOL HOLDER STRUCTURE

(71) Applicant: BYD COMPANY LIMITED, Shenzhen (CN)

(72) Inventors: Jie Li, Shenzhen (CN); Lu Zhao, Shenzhen (CN); Yaoqin Huang, Shenzhen (CN); Hongbin Wang, Shenzhen (CN); Jiaolian Xu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 104 days.

(21) Appl. No.: 18/614,896

(22) Filed: Mar. 25, 2024

(65) Prior Publication Data

US 2024/0227048 A1     Jul. 11, 2024

Related U.S. Application Data

(63) Continuation of application No. PCT/CN2022/125886, filed on Oct. 18, 2022.

(30) Foreign Application Priority Data

Nov. 19, 2021     (CN) .......................... 202122856618.6

(51) Int. Cl.
   *B23D 79/02*     (2006.01)
(52) U.S. Cl.
   CPC .................................. *B23D 79/023* (2013.01)

(58) Field of Classification Search
   CPC .................................................... B23D 79/023
   See application file for complete search history.

(56) References Cited

U.S. PATENT DOCUMENTS

| | | | | |
|---|---|---|---|---|
| 3,165,028 A | * | 1/1965 | Keska | .................... B23K 37/08 407/113 |
| 3,819,898 A | * | 6/1974 | Boston | ................. B23D 79/023 219/617 |
| 4,233,928 A | | 11/1980 | Hara et al. | |
| 4,893,972 A | * | 1/1990 | Blaho | .................... B23K 37/08 409/294 |

(Continued)

FOREIGN PATENT DOCUMENTS

| | | |
|---|---|---|
| CN | 104455168 A | 3/2015 |
| CN | 204997180 U | 1/2016 |

(Continued)

OTHER PUBLICATIONS

International Search Report of Application No. PCT/CN2022/125886 dated Jan. 19, 2023.

(Continued)

*Primary Examiner* — Omar Flores Sanchez
(74) *Attorney, Agent, or Firm* — Calfee, Halter & Griswold LLP

(57) ABSTRACT

An inner burr removal tool holder, including a tool holder body. The tool holder body includes a tool base and a connecting rod assembly. The connecting rod assembly is connected to the tool base. A scraper for removing inner burrs and a nozzle for spraying liquid is arranged on the tool base. The scraper protrudes from an outer surface of the tool base, and a liquid outlet of the nozzle faces the scraper.

20 Claims, 6 Drawing Sheets

(56)                  References Cited

U.S. PATENT DOCUMENTS

| 9,895,758 | B2 * | 2/2018 | Wang | ..................... | B23K 37/08 |
| 2016/0214185 | A1 * | 7/2016 | Faessler | ................ | B23B 51/101 |

FOREIGN PATENT DOCUMENTS

| CN | 105414672 | A | | 3/2016 | | |
| CN | 206578377 | U | | 10/2017 | | |
| CN | 108856905 | A | | 11/2018 | | |
| CN | 209006691 | U | | 6/2019 | | |
| CN | 110052665 | A | | 7/2019 | | |
| CN | 209288439 | A | | 8/2019 | | |
| CN | 216462246 | U | | 5/2022 | | |
| FR | 1326161 | A | | 5/1963 | | |
| KR | 100682318 | B1 | | 2/2007 | | |
| KR | 20230169843 | A | * | 12/2023 | ........... | H01L 21/304 |

OTHER PUBLICATIONS

Written opinion of Application No. PCT/CN2022/125886 dated Jan. 19, 2023.

* cited by examiner

INNER BURR REMOVAL TOOL HOLDER STRUCTURE

CROSS-REFERENCE TO RELATED APPLICATIONS

This application is a bypass continuation application of PCT International Application No. PCT/CN2022/125886, filed on Oct. 18, 2022, which claims priority to and benefits of Chinese Patent Application No. 202122856618.6, filed on Nov. 19, 2021 and entitled "INNER BURR REMOVAL TOOL HOLDER STRUCTURE". The entire contents of the above-referenced applications are incorporated herein by reference.

FIELD

The present disclosure relates to the technical field of metal machining devices, and more, to an inner burr removal tool holder structure.

BACKGROUND

A longitudinally welded pipe is a pipe made by rolling a long strip of metal strip of a certain specification into a round tube or another shape by using a high-frequency welding set, and longitudinally welding the pipe, and a weld seam is axially parallel to a metal pipe. A shape of the longitudinally welded pipe may be round, square, or special-shaped, depending on sizing and rolling after welding. A production process of the longitudinally welded pipe is simple, production efficiency is high, costs are low, and a development is fast.

During a welding process of an existing longitudinally welded pipe, there are always residual welding overlap or burrs on an inner and outer surface of a weld seam. Burrs on the outer surface are relatively easy to remove. Due to a space constraint of a pipe diameter, a removal process of inner burrs is difficult. This greatly limits a range of use of a welded pipe. Dealing with the inner burrs after a welding process requires a development of a corresponding device. This increases costs and affects efficiency.

An existing tool holder structure for removing the inner burrs is provided, and in the welding process of the longitudinally welded pipe, the weld seam is cut, by extending the tool holder structure inside of the longitudinally welded pipe, to achieve a purpose of removing the inner burrs. However, the tool holder structure usually moves in a straight line along the weld seam, and it is easy to cause burr accumulation on the tool holder structure, and accuracy and stability control of burr removal in the longitudinally welded pipe is poor.

SUMMARY

To solve a problem of burr accumulation during removal of inner burrs in an existing tool holder structure, which affects an effect of burr removal, the present disclosure provides an inner burr removal tool holder structure.

To solve the foregoing technical problem, technical solutions in the present disclosure are as follows.

The present disclosure provides an inner burr removal tool holder structure, including a tool holder body. The tool holder body includes a tool base and a connecting rod assembly. The connecting rod assembly is connected to the tool base. A scraper for removing inner burrs and a nozzle for spraying liquid is arranged on the tool base. The scraper protrudes from an outer surface of the tool base, and a liquid outlet of the nozzle faces the scraper.

In some embodiments, a stepped hole is provided in the tool base, and at least one gasket is arranged on a stepped surface of the stepped hole. The gasket is a partial hollow-out structure, and the scraper is an annular structure. The scraper is embedded in the stepped hole and is abutted against the gasket, and the scraper is partially exposed in the stepped hole.

In some embodiments, the connecting rod assembly includes a first water channel. The first water channel extends along the connecting rod assembly, and the first water channel is communicated with the nozzle.

In some embodiments, a first roller protruding from the outer surface of the tool base is arranged on the tool base, and an annular relief slot is provided in an outer wall of the first roller along a circumferential direction of the first roller.

In some embodiments, there are multiple first rollers.

In some embodiments, a first accommodation slot accommodating the first roller is provided in the outer surface of the tool base, and two sides of the first roller are rotatably connected to an inner wall of the first accommodation slot.

In some embodiments, the tool holder body further includes a roller base. The tool base and the roller base are respectively located at two sides of an end of the connecting rod assembly, and a second roller protruding from an outer surface of the roller base is arranged on the roller base.

In some embodiments, there are a plurality of second rollers.

In some embodiments, a second accommodation slot accommodating the second roller is provided in the outer surface of the roller base, and two sides of the second roller are rotatably connected to an inner wall of the second accommodation slot.

In some embodiments, the connecting rod assembly includes a first tool holder rod, a second tool holder rod, a third tool holder rod, and a fourth tool holder rod. The first tool holder rod, the second tool holder rod, the third tool holder rod, and the fourth tool holder rod are connected end-to-end in sequence. The tool base is arranged at an end of the fourth tool holder rod.

In some embodiments, the first tool holder rod, the second tool holder rod, the third tool holder rod, and the fourth tool holder rod extend along a straight line. The first tool holder rod, the second tool holder rod, the third tool holder rod, and the fourth tool holder rod are matched in a concave-convex structure, and are fastened and connected by screws.

In some embodiments, a magnetic rod is arranged on the second tool holder rod, and the magnetic rod extends along an outer wall of the second tool holder rod.

In some embodiments, the connecting rod assembly further includes a second water channel, and the second water channel flows through the magnetic rod.

In some embodiments, the second water channel includes a water inlet pipe, a through channel, a cooling channel, and a water outlet pipe. A protective sleeve is arranged outside the magnetic rod, an inner wall of the protective sleeve and an outer wall of the magnetic rod constitute the cooling channel. The water inlet pipe and the water outlet pipe are arranged on the first tool holder rod. The through channel is arranged inside the second tool holder rod. The water inlet pipe is communicated with the through channel, the through channel is communicated with the cooling channel, and the cooling channel is communicated with the water outlet pipe.

In some embodiments, the inner burr removal tool holder structure further includes a tool rod mounting base and a supporting base. An end of the connecting rod assembly away from the tool base is fixed on the tool rod mounting base. A height-adjusting structure for adjusting a height is provided on the tool rod mounting base. The supporting base is configured to support a longitudinally welded pipe to allow for insertion of the tool base.

In some embodiments, the height-adjusting structure includes a sliding block, an adjusting base, a threaded rod, and a rotating handle. The sliding block is fixed at the end of the connecting rod assembly away from the tool base. The sliding block is arranged on the adjusting base in a vertically slidable manner. The threaded rod is rotatably connected to the adjusting base, and the threaded rod passes through the sliding block and is threadedly fitted with the sliding block. The rotating handle is connected to the threaded rod. The rotating handle can be rotated to implement height adjustments of the connecting rod assembly and the tool base via the threaded fit of the threaded rod and the sliding block.

In some embodiments, a plurality of upper supporting wheels and a plurality of lower supporting wheels are arranged on the supporting base. The upper supporting wheels and the lower supporting wheels are spaced apart from each other in the vertical direction to support the longitudinally welded pipe.

According to the inner burr removal tool holder structure provided in the present disclosure, the nozzle for spraying liquid is arranged on one side of the scraper, and when the nozzle can perform an inner burr removal operation of a longitudinally welded pipe by the scraper, cooling water is sprayed at a position of the scraper, so that burrs accumulated on the scraper are dispersed, accumulation of burrs on the scraper is avoided, burrs that are sprayed down flows out of the longitudinally welded pipe with the cooling water, and the cooling water also cools the scraper. This avoids performance deterioration of caused by overheating of the scraper, and effectively improves a service life of the scraper.

DETAILED DESCRIPTION

To make the solved technical problems, the technical solutions, and the beneficial effects in the present disclosure more comprehensible, the following further describes the present disclosure in detail with reference to the accompanying drawings and embodiments. It should be understood that the specific embodiments described herein are merely used for explaining the present disclosure instead of limiting the present disclosure.

As shown in FIG. 1 to FIG. 8, an embodiment of the present disclosure provides an inner burr removal tool holder structure, including a tool holder body. The tool holder body includes a tool base 2 and a connecting rod assembly 1. The connecting rod assembly 1 is connected to the tool base 2. A scraper 24 for removing inner burrs and a nozzle 23 for spraying liquid is arranged on the tool base 2. The scraper 24 protrudes from an outer surface of the tool base 2, and a liquid outlet of the nozzle 23 faces the scraper 24.

Figure 1:
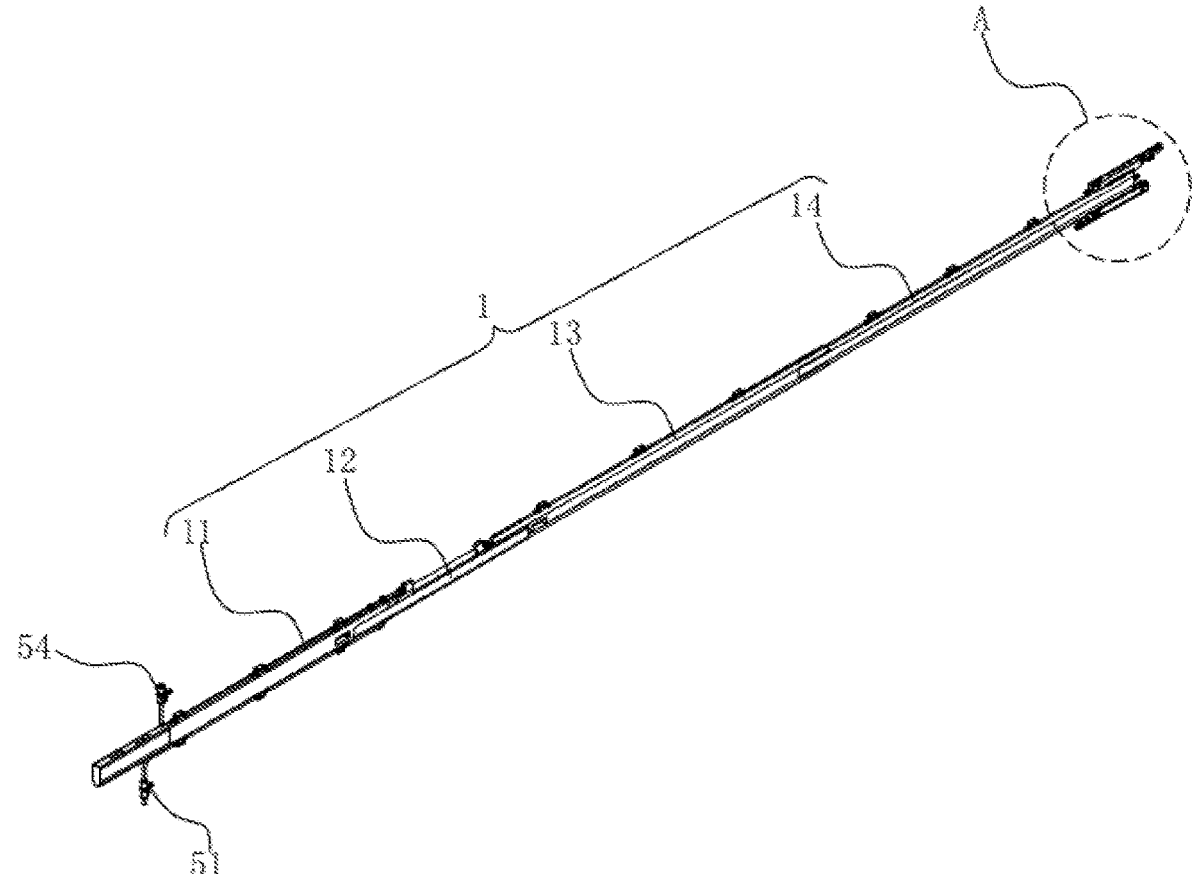
FIG. 1 is a schematic diagram of a structure of an inner burr removal tool holder structure according to the present disclosure.
Figure 2:
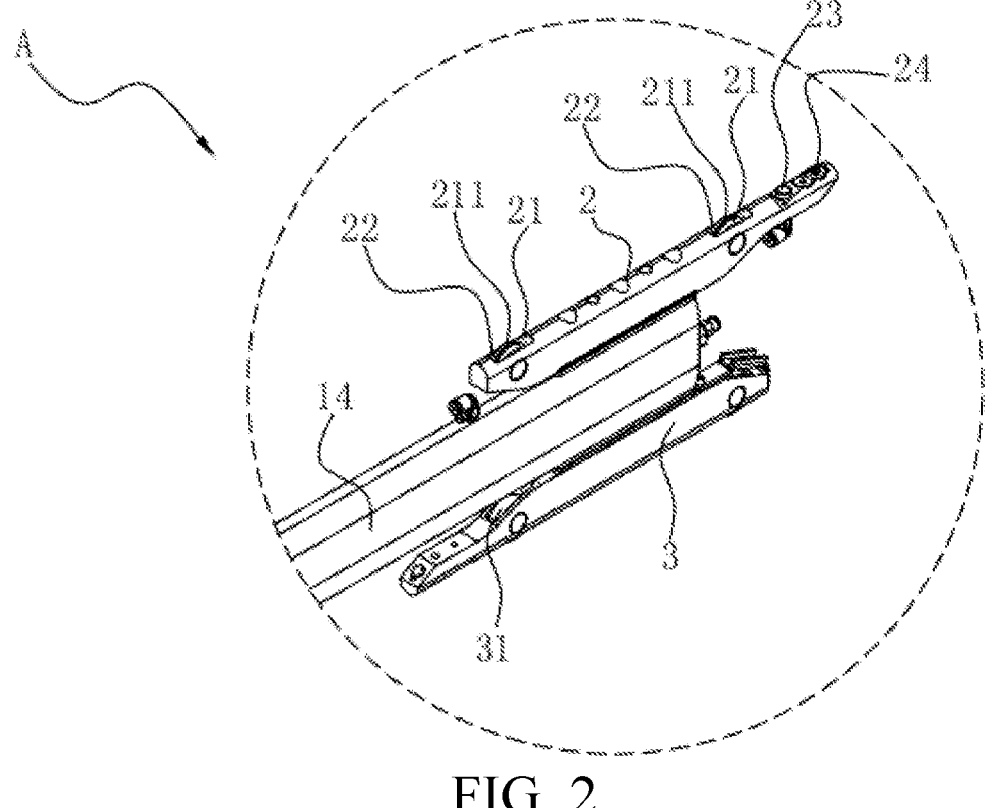
FIG. 2 is an enlarged schematic diagram of a position A in FIG. 1.
Figure 5:
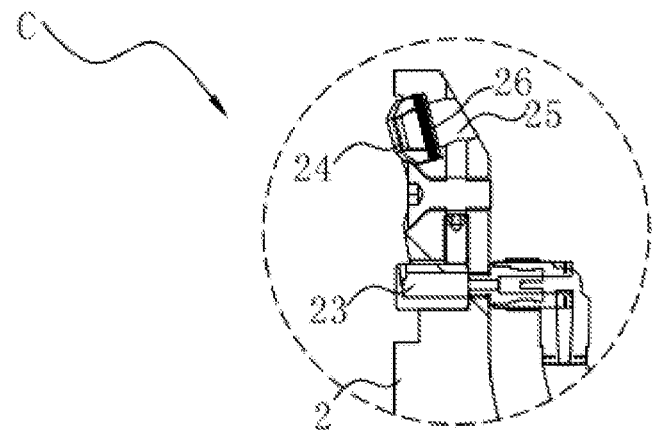
FIG. 5 is an enlarged schematic diagram of a position C in FIG. 4.

As shown in FIG. 2 and FIG. 5, the nozzle 23 for spraying liquid is arranged on one side of the scraper 24, and when the nozzle 23 can perform an inner burr removal operation of a longitudinally welded pipe by the scraper 24, cooling water is sprayed at a position of the scraper 24, so that burrs accumulated on the scraper 24 are dispersed, accumulation of burrs on the scraper 24 is avoided, burrs that are sprayed down flows out of the longitudinally welded pipe with the cooling water, and the cooling water also cools the scraper 24. This avoids performance deterioration caused by overheating of the scraper 24, and effectively improves a service life of the scraper 24.

As shown in FIG. 5, in this embodiment, a stepped hole 25 is provided in the tool base 2, and at least one gasket 26 is arranged on a stepped surface of the stepped hole 25. The gasket 26 is a partial hollow-out structure, and the scraper 24 is an annular structure. The scraper 24 is embedded in the stepped hole 25 and is abutted against the gasket 26, and the scraper 24 is partially exposed in the stepped hole 25.

The gasket 26 adjusts a height of the scraper 24 protruding from the stepped hole 25. A thickness of the gasket 26 or a quantity of stacks can be adjusted to adjust a distance between the scraper 24 and the stepped surface of the stepped hole 25, and the protruding height of the scraper 24 can be adjusted, so that the inner burr removal tool holder structure adjusts an inner burr scraping height of a longitudinally welded pipe to improve adjustment accuracy.

Because the scraper 24 is an annular structure, burrs scraped off by the scraper 24 may fall from the bottom of the stepped hole 25 through a middle hole of the scraper 24, to reduce a risk of burr accumulation. In addition, the gasket 26 is arranged as a partial hollow-out structure, so that blockage of the stepped hole 25 by burrs due to the use of the gasket 26 can be avoided. In different embodiments, the gasket 26 may be selected from a grid structure or another opening structure.

In this embodiment, the connecting rod assembly 1 includes a first water channel 4, the first water channel 4 extends along the connecting rod assembly 1, and the first water channel 4 is communicated with the nozzle 23.

Figure 4:
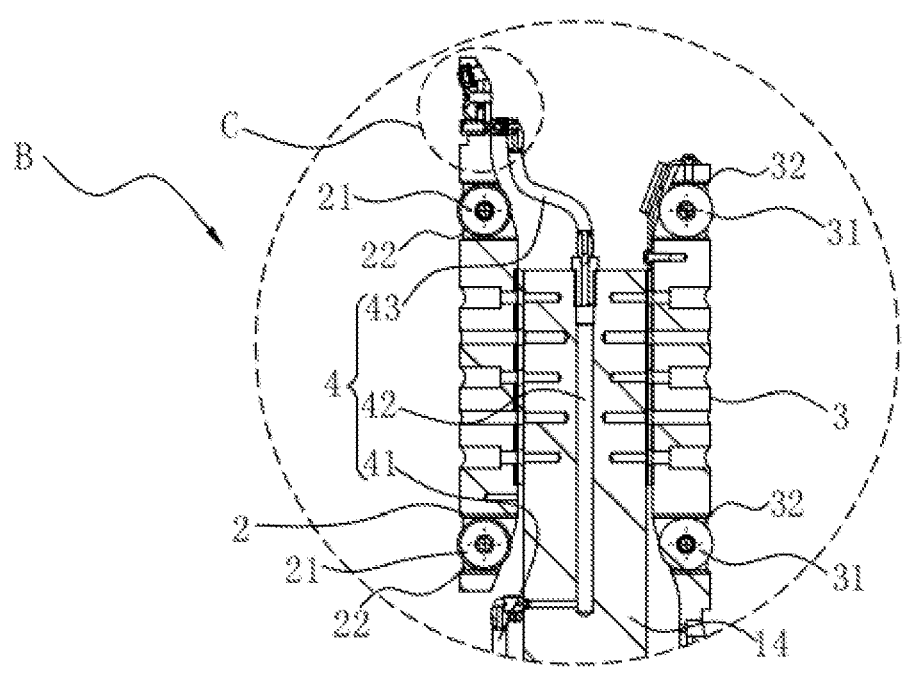
FIG. 4 is an enlarged schematic diagram of a position B in FIG. 3.

As shown in FIG. 4, in this embodiment, a first roller 21 protruding from the outer surface of the tool base 2 is arranged on the tool base 2, and an annular relief slot 211 is provided in an outer wall of the first roller 21 along a circumferential direction of the first roller 21.

The first roller 21 is configured to be in contact with an inner wall of the longitudinally welded pipe to reduce frictional force of the tool holder body moving inside the longitudinally welded pipe. Because the first roller 21 is a support of the tool base 2, in a process of scraping off the inner burrs by the scraper 24, the tool base 2 moves relative to the longitudinally welded pipe, the first roller 21 produces compressive force to a straight weld seam, and the straight weld seam that just be welded is fragile, so that the straight weld seam is easily crushed by the first roller 21. To solve the problem, the annular relief slot 211 is provided in the circumferential direction of the first roller 21, and in a process of rolling the first roller 21, the annular relief slot 211 is used for passage of the straight weld seam of the longitudinally welded pipe, to avoid an impact of the first roller 21 on the straight weld seam of the longitudinally welded pipe.

In this embodiment, there are a plurality of first rollers 21, a first accommodation slot 22 accommodating the first roller 21 is provided in the outer surface of the tool base 2, and two sides of the first roller 21 are rotatably connected to an inner wall of the first accommodation slot 22, to prevent the first roller 21 from excessively protruding from the outer surface of the tool base 2.

In this embodiment, the tool holder body further includes a roller base 3. The tool base 2 and the roller base 3 are respectively located at two sides of an end of the connecting rod assembly 1, and a second roller 31 protruding from an outer surface of the roller base 3 is arranged on the roller base 3.

A function of the second roller 31 is similar to that of the first roller 21, and the second roller 31 and the first roller 21 are both configured to be in contact with the inner wall of the longitudinally welded pipe to reduce the frictional force of the tool holder body moving inside the longitudinally welded pipe. There are a plurality of second rollers 31, a second accommodation slot 32 accommodating the second roller 31 is provided in the outer surface of the roller base 3, and two sides of the second roller 31 are rotatably connected to an inner wall of the second accommodation slot 32, to prevent the second roller 31 from excessively protruding from the outer surface of the roller base 3.

Figure 3:
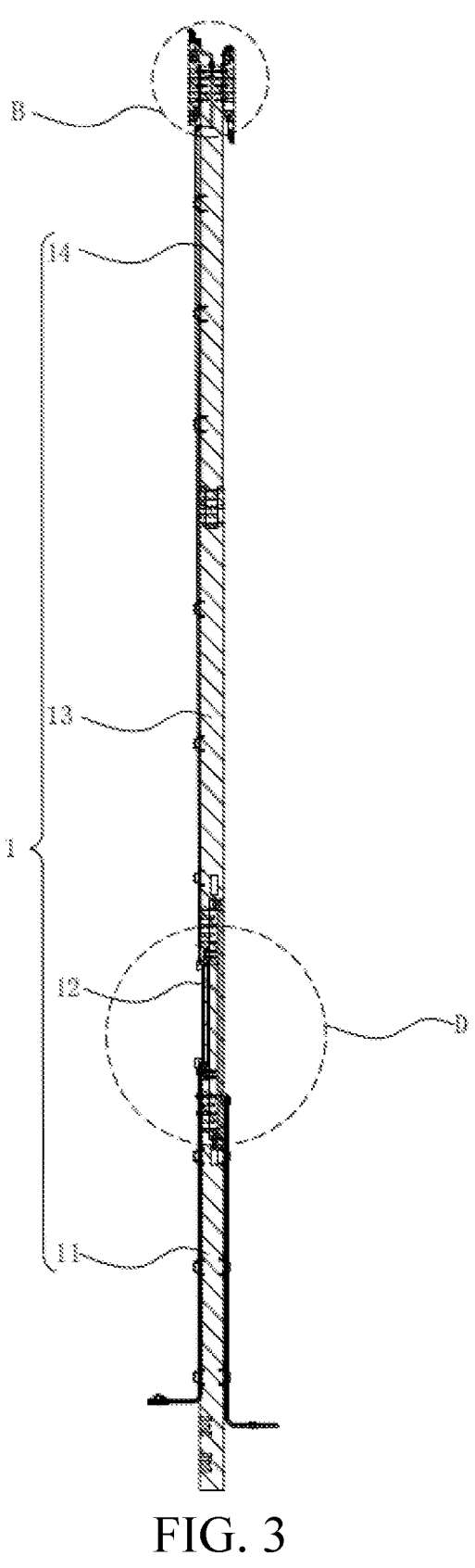
FIG. 3 is a schematic sectional view of an inner burr removal tool holder structure according to the present disclosure.

As shown in FIG. 3, in this embodiment, the connecting rod assembly 1 includes a first tool holder rod 11, a second tool holder rod 12, a third tool holder rod 13, and a fourth tool holder rod 14. The first tool holder rod 11, the second tool holder rod 12, the third tool holder rod 13, and the fourth tool holder rod 14 are connected end-to-end in sequence. The tool base 2 is arranged at an end of the fourth tool holder rod 14. The tool base 2 and the roller base 3 are respectively located at two sides of the end of the fourth tool holder rod 14.

The first tool holder rod 11, the second tool holder rod 12, the third tool holder rod 13, and the fourth tool holder rod 14 extend along a straight line. The first tool holder rod 11, the second tool holder rod 12, the third tool holder rod 13, and the fourth tool holder rod 14 are matched in a concave-convex structure, and are fastened and connected by screws.

Figure 6:
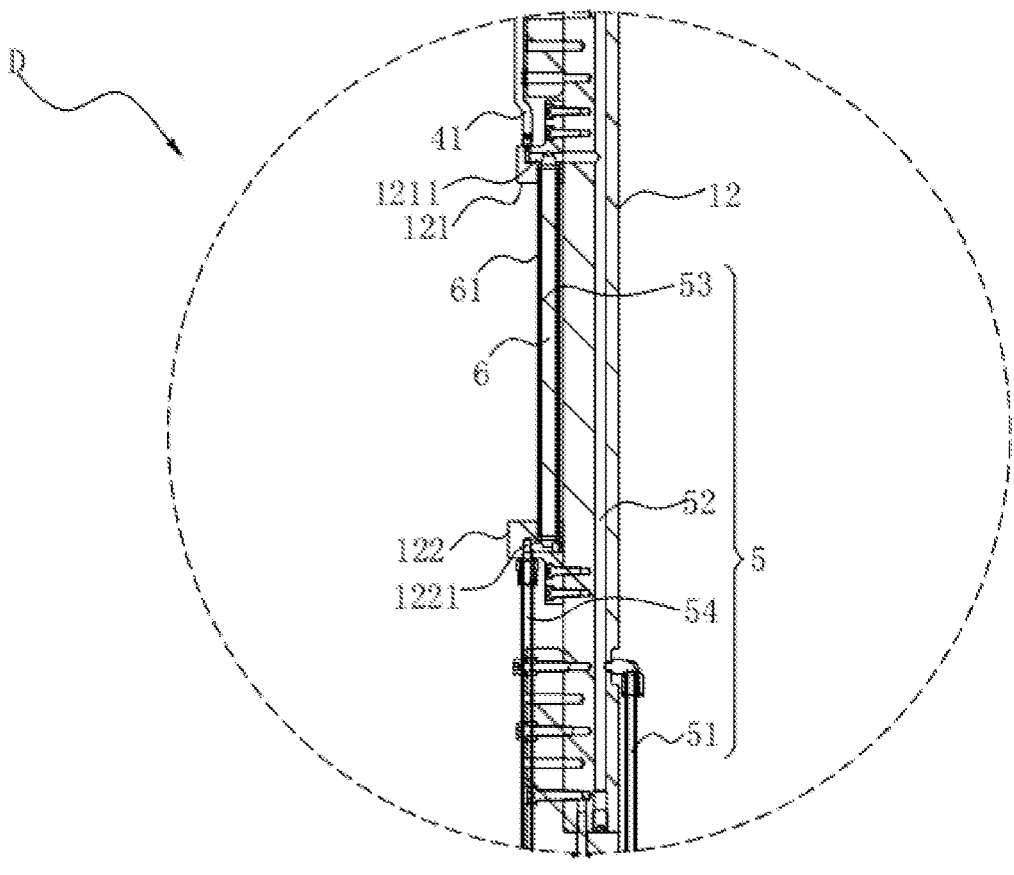
FIG. 6 is an enlarged schematic diagram of a position D in FIG. 3.

As shown in FIG. 6, a magnetic rod 6 is arranged on the second tool holder rod 12, and the magnetic rod 6 extends along an outer wall of the second tool holder rod 12.

The magnetic rod 6 is an impeder, and when a welding operation of the longitudinally welded pipe is performed, the magnetic rod 6 may be moved to a corresponding position of an induction coil. The operation cancels an impact of part of high-frequency induced magnetic fields generated by the induction coil on the second tool holder rod 12, to avoid overheating and melting of the second tool holder rod 12.

In this embodiment, the connecting rod assembly 1 further includes a second water channel 5, and the second water channel 5 flows through the magnetic rod 6.

In the welding operation of the longitudinally welded pipe, a temperature of a welding position is high, if a problem of overheating occurs on the magnetic rod 6, the magnetic rod 6 is damaged. The magnetic rod 6 is cooled down by setting the second water channel 5, so that a problem that a temperature of the magnetic rod 6 is excessively high is avoided.

In this embodiment, the second water channel 5 includes a water inlet pipe 51, a through channel 52, a cooling channel 53, and a water outlet pipe 54. A protective sleeve 61 is arranged outside the magnetic rod 6, an inner wall of the protective sleeve 61 and an outer wall of the magnetic rod 6 constitute the cooling channel 53. The protective sleeve 61 has a good protective effect on the magnetic rod 6, so that an abrasion of the magnetic rod 6 in a moving process of the longitudinally welded pipe is avoided, and an impact of falling welding liquid on the magnetic rod 6 is also avoided. The protective sleeve 61 is selected from an epoxy resin pipe and has good heat resistance. The water inlet pipe 51 and the water outlet pipe 54 are arranged on the first tool holder rod 11. The through channel 52 is arranged inside the second tool holder rod 12. The water inlet pipe 51 is communicated with the through channel 52, the through channel 52 is communicated with the cooling channel 53, and the cooling channel 53 is communicated with the water outlet pipe 54. When cooling water is inlet, the cooling water enters the through channel 52 from the water inlet pipe 51, then flows into the cooling channel 53 through the through channel 52, plays a role of heat exchange and cooling on the magnetic rod 6 in the cooling channel 53, and is discharged through the water outlet pipe 54 to achieve cooling of the magnetic rod 6.

The water inlet pipe 51 and the water outlet pipe 54 are respectively arranged on outer walls of two sides of the first tool holder rod 11, and extension directions of the water inlet pipe 51 and the water outlet pipe 54 are consistent with the length direction of the first tool holder rod 11. One end of the water inlet pipe 51 is introduced from one end on the first tool holder rod 11 away from the second tool holder rod 12, and the other end of the water inlet pipe 51 extends to the second tool holder rod 12 and is communicated with the through channel 52. A first mounting base 121 and a second mounting base 122 are arranged on the second tool holder rod 12, and the first mounting base 121 and the second mounting base 122 are spaced apart from each other. Two ends of the protective sleeve 61 are connected to the first mounting base 121 and the second mounting base 122 via a sealing ring. A first channel 1211 for communicating the through channel 52 and the cooling channel 53 is arranged inside the first mounting base 121. A second channel 1221 for communicating the cooling channel 53 and the water outlet pipe 54 is arranged inside the second mounting base 122. One end of the water outlet pipe 54 is connected to the second mounting base 122, and the other end of the water outlet pipe 54 extends to one end on the first tool holder rod 11 away from the second tool holder rod 12, and is led out.

As shown in FIG. 4 and FIG. 6, in this embodiment, the first water channel 4 is led out from the second water channel 5. The first water channel 4 includes a first water pipe 41, a third channel 42, and a second water pipe 43. The first water pipe 41 is led out from the first channel 1211 on the first mounting base 121 and extends along outer walls of the third tool holder rod 13 and the fourth tool holder rod 14. The third channel 42 is arranged at an end of the fourth tool holder rod 14 away from the third tool holder rod 13. The first water pipe 41 is communicated with the third channel 42. The second water pipe 43 is separately communicated with the third channel 42 and the nozzle 23.

Figure 7:
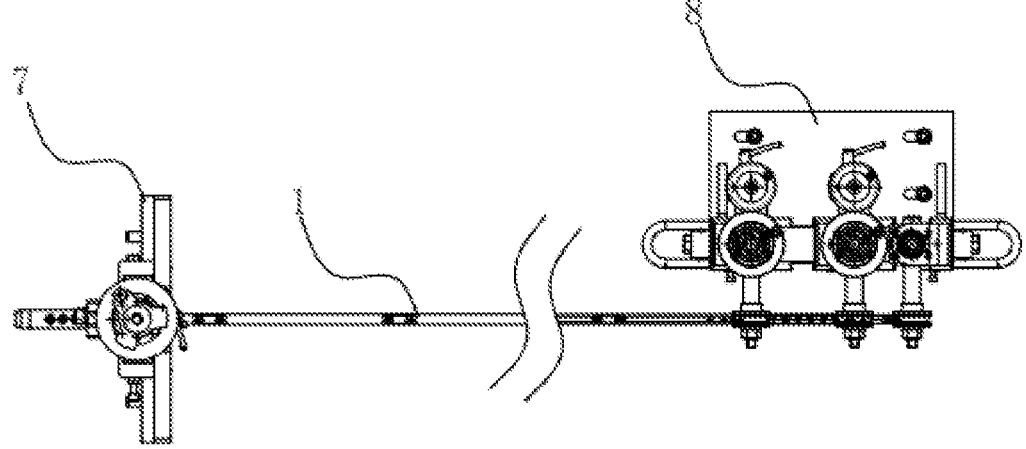
FIG. 7 is an installation top view of an inner burr removal tool holder structure according to the present disclosure.
Figure 8:
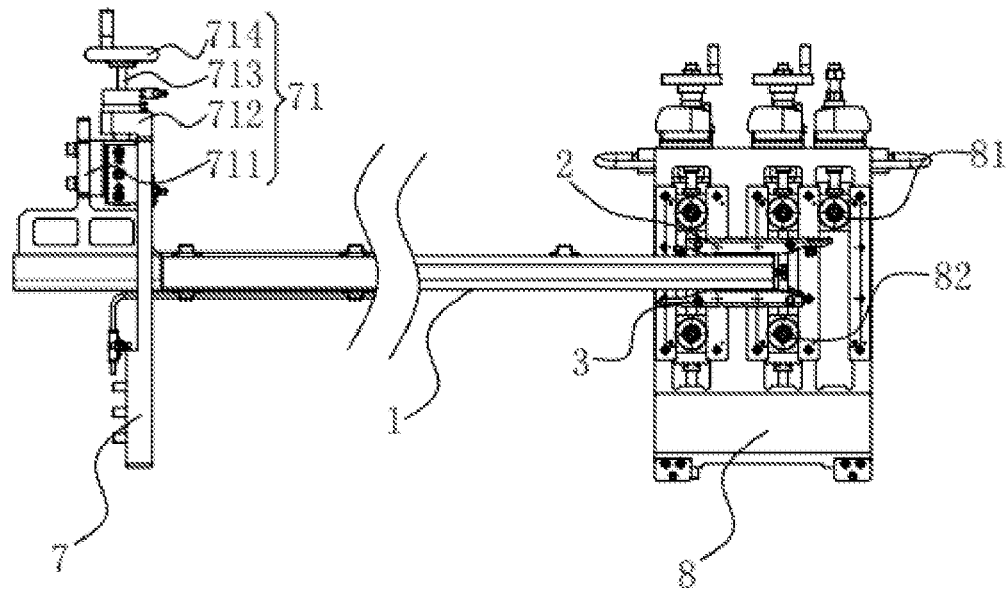
FIG. 8 is an installation front view of an inner burr removal tool holder structure according to the present disclosure.

As shown in FIG. 7 and FIG. 8, the inner burr removal tool holder structure further includes a tool rod mounting base 7 and a supporting base 8. An end of the connecting rod assembly 1 away from the tool base 2 is fixed on the tool rod mounting base 7. A height-adjusting structure 71 for adjusting a height is arranged on the tool rod mounting base 7. The supporting base 8 is configured to support a longitudinally welded pipe to allow for insertion of the tool base 2.

When an inner burr removal operation of the longitudinally welded pipe is performed, the longitudinally welded pipe may be placed on the supporting base 8 and the tool base 2 may be extended into the longitudinally welded pipe. Heights of the connecting rod assembly 1 and the tool base 2 are adjusted by the height-adjusting structure 71, so that the scraper 24 on the tool base 2 is in contact with a straight weld seam of the longitudinally welded pipe. The scraper 24 is moved relative to the longitudinally welded pipe by driving the longitudinally welded pipe forward, so that the inner burrs in the longitudinally welded pipe are scraped off.

The height-adjusting structure 71 includes a sliding block 711, an adjusting base 712, a threaded rod 713, and a rotating handle 714. The sliding block 711 is fixed at the end of the connecting rod assembly 1 away from the tool base 2. The sliding block 711 is arranged on the adjusting base 712 in a vertically slidable manner. The threaded rod 713 is rotatably connected to the adjusting base 712, and the threaded rod 713 passes through the sliding block 711 and is threadedly fitted with the sliding block 711. The rotating handle 714 is connected to the threaded rod 713. When heights of the connecting rod assembly 1 and the tool base 2 need to be adjusted, the rotating handle 714 can be rotated to implement height adjustment via the threaded fit between the threaded rod 713 and the sliding block 711.

A plurality of upper supporting wheels 81 and a plurality of lower supporting wheels 82 are arranged on the supporting base 8, and the upper supporting wheels 81 and the lower supporting wheels 82 are spaced apart from each other in the vertical direction to support the longitudinally welded pipe in the middle of the upper supporting wheels 81 and the lower supporting wheels 82.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

The reference numerals in the accompanying drawings are as follows.

1: connecting rod assembly; 11: first tool holder rod; 12: second tool holder rod; 121: first mounting base; 1211: first channel; 122: second mounting base; 1221: second channel; 13: third tool holder rod; 14: fourth tool holder rod; 2: tool base; 21: first roller; 211: annular relief slot; 22: first accommodation slot; 23: nozzle; 24: scraper; 25: stepped hole; 26: gasket; 3: roller base; 31: second roller; 32: second accommodation slot; 4: first water channel; 41: first water pipe; 42: third channel; 43: second water pipe; 5: second water channel; 51: water inlet pipe; 52: through channel; 53: cooling channel; 54: water outlet pipe; 6: magnetic rod; 61: protective sleeve; 7: tool rod mounting base; 71: height-adjusting structure; 711: sliding block; 712: adjusting base; 713: threaded rod; 714: rotating handle; 8: supporting base; 81: upper supporting wheel; 82: lower supporting wheel.

What is claimed is:

1. An inner burr removal tool holder, comprising a tool holder body, the tool holder body comprising a tool base and a connecting rod assembly, the connecting rod assembly being connected to the tool base, a scraper configured to remove inner burrs and a nozzle configured to spray liquid being arranged on the tool base, the scraper protruding from an outer surface of the tool base, and a liquid outlet of the nozzle facing the scraper.

2. The inner burr removal tool holder according to claim 1, wherein a stepped hole is provided in the tool base, at least one gasket is arranged on a stepped surface of the stepped hole, the gasket is partial hollow-out, the scraper is annular, the scraper is embedded in the stepped hole and is abutted against the gasket, and the scraper is partially exposed in the stepped hole.

3. The inner burr removal tool holder according to claim 1, wherein the connecting rod assembly comprises a first water channel, the first water channel extends along the connecting rod assembly, and the first water channel is communicated with the nozzle.

4. The inner burr removal tool holder according to claim 1, wherein a first roller protruding from the outer surface of the tool base is arranged on the tool base, and an annular relief slot is provided in an outer wall of the first roller along a circumferential direction of the first roller.

5. The inner burr removal tool holder according to claim 4, further comprising a plurality of first rollers.

6. The inner burr removal tool holder according to claim 4, wherein a first accommodation slot accommodating the first roller is provided in the outer surface of the tool base, and two sides of the first roller are rotatably connected to an inner wall of the first accommodation slot.

7. The inner burr removal tool holder according to claim 1, wherein the tool holder body further comprises a roller base, the tool base and the roller base are located at two sides of an end of the connecting rod assembly, and a second roller protruding from an outer surface of the roller base is arranged on the roller base.

8. The inner burr removal tool holder according to claim 7, further comprising a plurality of second rollers.

9. The inner burr removal tool holder according to claim 7, wherein a second accommodation slot accommodating the second roller is provided in the outer surface of the roller base, and two sides of the second roller are rotatably connected to an inner wall of the second accommodation slot.

10. The inner burr removal tool holder according to claim 1, wherein the connecting rod assembly comprises a first tool holder rod, a second tool holder rod, a third tool holder rod, and a fourth tool holder rod, the first tool holder rod, the second tool holder rod, the third tool holder rod, and the fourth tool holder rod are connected end-to-end, and the tool base is arranged at an end of the fourth tool holder rod.

11. The inner burr removal tool holder according to claim 10, wherein the first tool holder rod, the second tool holder rod, the third tool holder rod, and the fourth tool holder rod extend along a straight line, and the first tool holder rod, the second tool holder rod, the third tool holder rod, and the fourth tool holder rod are concave-convexly matched, and are fastened and connected by screws.

12. The inner burr removal tool holder according to claim 10, wherein a magnetic rod is arranged on the second tool holder rod, and the magnetic rod extends along an outer wall of the second tool holder rod.

13. The inner burr removal tool holder according to claim 12, wherein the connecting rod assembly further comprises a second water channel, and the second water channel flows through the magnetic rod.

14. The inner burr removal tool holder according to claim 13, wherein the second water channel comprises a water inlet pipe, a through channel, a cooling channel, and a water outlet pipe, a protective sleeve is arranged outside the magnetic rod, an inner wall of the protective sleeve and an outer wall of the magnetic rod surround the cooling channel, the water inlet pipe and the water outlet pipe are arranged on the first tool holder rod, the through channel is arranged inside the second tool holder rod, the water inlet pipe is communicated with the through channel, the through channel is communicated with the cooling channel, and the cooling channel is communicated with the water outlet pipe.

15. The inner burr removal tool holder according to claim 1, further comprising a tool rod mounting base and a supporting base, an end of the connecting rod assembly away from the tool base being fixed on the tool rod mounting base, a height-adjusting element for adjusting a height being provided on the tool rod mounting base, and the supporting base being configured to support a longitudinally welded pipe for insertion of the tool base.

16. The inner burr removal tool holder according to claim 15, wherein the height-adjusting element comprises a sliding block, an adjusting base, a threaded rod, and a rotating handle, the sliding block is fixed at the end of the connecting rod assembly away from the tool base, the sliding block is arranged on the adjusting base in a vertically slidable manner, the threaded rod is rotatably connected to the adjusting base, the threaded rod passes through the sliding block and is threadedly fitted with the sliding block, the rotating handle is connected to the threaded rod, and the rotating handle can be rotated to implement height adjustments of the connecting rod assembly and the tool base via the threaded fit of the threaded rod and the sliding block.

17. The inner burr removal tool holder according to claim 15, wherein a plurality of upper supporting wheels and a plurality of lower supporting wheels are arranged on the supporting base, and the upper supporting wheels and the lower supporting wheels are spaced apart from each other in the vertical direction to support the longitudinally welded pipe.

18. The inner burr removal tool holder according to claim 2, wherein the connecting rod assembly comprises a first water channel, the first water channel extends along the connecting rod assembly, and the first water channel is communicated with the nozzle.

19. The inner burr removal tool holder according to claim 3, wherein a first roller protruding from the outer surface of the tool base is arranged on the tool base, and an annular relief slot is provided in an outer wall of the first roller along a circumferential direction of the first roller.

20. The inner burr removal tool holder according to claim 5, wherein a first accommodation slot accommodating the first roller is provided in the outer surface of the tool base, and two sides of the first roller are rotatably connected to an inner wall of the first accommodation slot.

* * * * *